United States Patent
Shukla et al.

(10) Patent No.: US 11,436,280 B2
(45) Date of Patent: Sep. 6, 2022

(54) METHODS OF PROVIDING APPROXIMATE SOLUTIONS TO THE MAXIMUM CLIQUE OF A GRAPH USING EXPANSION OF CLIQUES OF SUBGRAPHS WITHIN A GRAPH AND RELATED CIRCUITS AND PROCESSOR-EXECUTABLE INSTRUCTIONS

(71) Applicant: University of Virginia Patent Foundation, Charlottesville, VA (US)

(72) Inventors: Nikhil Shrikant Shukla, Charlottesville, VA (US); Mohammad Khairul Bashar, Charlottesville, VA (US); Antik Mallick, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 246 days.

(21) Appl. No.: 16/861,706

(22) Filed: Apr. 29, 2020

(65) Prior Publication Data

US 2020/0342028 A1   Oct. 29, 2020

Related U.S. Application Data

(60) Provisional application No. 62/840,018, filed on Apr. 29, 2019.

(51) Int. Cl.
*G06F 16/901* (2019.01)

(52) U.S. Cl.
CPC ............................... *G06F 16/9024* (2019.01)

(58) Field of Classification Search
None
See application file for complete search history.

(56) References Cited

U.S. PATENT DOCUMENTS

| | | | |
|---|---|---|---|
| 2016/0147591 A1* | 5/2016 | Sadaphal | G06Q 10/063 714/15 |
| 2017/0124218 A1* | 5/2017 | Atasu | G06F 16/9024 |
| 2017/0365071 A1* | 12/2017 | Rossi | H03M 7/30 |

OTHER PUBLICATIONS

Maffezzoni et al., "Modeling and Simulation of Vanadium Dioxide Relaxation Oscillators," IEEE Transactions on Circuits and Systems—1: Regular Papers, vol. 62, No. 9, Sep. 2015, pp. 2207-2215.

(Continued)

*Primary Examiner* — Uyen T Le
(74) *Attorney, Agent, or Firm* — Stanek Lemon Crouse & Meeks, PA

(57) ABSTRACT

A method of approximating a maximum clique of a graph can be provided by operating a plurality of non-linear oscillator/coupling capacitor circuits connected to one another according to a respective plurality of degree-ordered subgraphs of the graph to provide respective candidate cliques for a maximum clique of the graph. Nodes in the graph that are connected to all of the nodes in each of the respective candidate cliques can be identified to provide respective expansion node subgraphs for the respective candidate cliques. The plurality of non-linear oscillator/coupling capacitor circuits connected to one another according to the respective expansion node subgraphs can be operated to provide respective expansion cliques for the respective candidate cliques and the respective expansion cliques can be added to the respective candidate cliques to identify a designated maximum clique for the graph.

15 Claims, 10 Drawing Sheets

(56) References Cited

OTHER PUBLICATIONS

Parihar et al., "Synchronization of pairwise-coupled, identical, relaxation oscillator based on metal-insulator phase transition devices: A model study," J. Appl. Phys. 117, 054902, 2015, pp. 054902-1-054902-14.

Parihar et al., "Vertex coloring of graphs via phase dynamics of coupled oscillatory networks," Scientific Reports, 7:911, Apr. 19, 2017, 11 pages.

Shukla et al. "Pairwise Coupled Hybrid Vanadium Dioxide-MOSFET (HVFET) Oscillators for Non-Boolean Associative Computing," IEEE, 2014, pp. 28.7.1-28.7.4.

Shukla et al., "Synchronized charge oscillations in correlated electron systems," Scientific Reports, 4: 4964, May 14, 2014, 6 pages.

* cited by examiner

| GRAPH | NODES | EDGES | MAX CLIQUE SIZE WITH COUPLED OSCILLATOR SYSTEM | MAX CLIQUE SIZE WITH BRON-KERBOSCH ALGORITHM | MAX CLIQUE SIZE |
|---|---|---|---|---|---|
| MYCIEL4 | 23 | 71 | 2 | 2 | - |
| QUEEN5 | 25 | 160 | 5 | 5 | - |
| JEAN | 80 | 254 | 10 | 10 | - |
| C125.9 | 125 | 6693 | 33 | - | 34 |
| KELLER4 | 171 | 9435 | 11 | - | 11 |
| BROCK200_2 | 200 | 9876 | 12 | - | 12 |
| p_HAT300-1 | 300 | 10933 | 8 | 8 | 8 |
| DSJC500_5 | 500 | 125480 | 12 | - | 13 |

FIG. 11

METHODS OF PROVIDING APPROXIMATE SOLUTIONS TO THE MAXIMUM CLIQUE OF A GRAPH USING EXPANSION OF CLIQUES OF SUBGRAPHS WITHIN A GRAPH AND RELATED CIRCUITS AND PROCESSOR-EXECUTABLE INSTRUCTIONS

CLAIM FOR PRIORITY

This application claims priority to Provisional Application Ser. No. 62/840,018, titled System, Method, and Computer Readable Medium for Solving the Maximum Clique Problem using Coupled Relaxation Oscillators, filed in the U.S. Patent and Trademark Office on Apr. 29, 2019, the entire disclosure of which is hereby incorporated herein by reference.

FIELD

The present invention relates to the field of electronics in general, and more particularly, to the use of coupled non-linear oscillator circuits to approximate a maximum clique of a graph.

BACKGROUND

Many problems arising in the areas of computational and structural chemistry, network security, molecular biology, social networks among others can be formulated as the classical Maximum Clique Problem (MCP) of finding the largest complete subgraph (known as clique) in a graph. However, the MCP has NP-Hard time complexity, and conventional algorithms running on a Von-Neumann machine are usually not appropriate for solving the MCP in graphs of practical relevance. Even some state-of-the-art approaches may only scale as $\sim O(1.19^n)$ which, may be the worst case, would imply $>10^{37}$ operations to find the maximum clique in a graph of 500 nodes.

SUMMARY

Embodiments according to the present invention can provide methods of providing approximate solutions to the maximum clique of a graph using expansion of cliques of subgraphs and related circuits and processor-executable instructions. Pursuant to these embodiments, a method of approximating a maximum clique of a graph can be provided by operating a plurality of non-linear oscillator/coupling capacitor circuits connected to one another according to a respective plurality of degree-ordered subgraphs of the graph to provide respective candidate cliques for a maximum clique of the graph. Nodes in the graph that are connected to all of the nodes in each of the respective candidate cliques can be identified to provide respective expansion node subgraphs for the respective candidate cliques. The plurality of non-linear oscillator/coupling capacitor circuits connected to one another according to the respective expansion node subgraphs can be operated to provide respective expansion cliques for the respective candidate cliques and the respective expansion cliques can be added to the respective candidate cliques to identify a designated maximum clique for the graph.

BRIEF DESCRIPTION OF THE DRAWINGS

FIG. 11 is a table which presents the maximum clique solution obtained using embodiments according to the invention and the Bron-Kerbosch algorithm and that specified by DIMACS database.

DETAILED DESCRIPTION OF EMBODIMENTS ACCORDING TO THE INVENTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, an approximation of a maximum clique of a graph (sometimes referred to as a solution to the "maximum clique problem") can be provided using an analog approach rather than a von-Neumann computing approach. For example, the MCP can be addressed by segmenting the graph into subgraphs and then finding the cliques of each subgraph using a network of non-linear oscillator/coupling capacitor circuits, such as VO2 based relaxation oscillator circuits, to find the independent sets of each of the complements of the subgraphs (i.e., the cliques of subgraphs) using a vertex coloring approach. The cliques can then be expanded by determining what other nodes (expansion nodes) in the graph are connected to all of the nodes in the cliques of the subgraphs. The same analog approach briefly described above can again be used to determine whether those expanded nodes and the respective clique form a maximal clique of the subgraph. Once the maximal cliques of the subgraphs are found, the largest one of the maximal cliques can be identified as an approximation of the maximum clique of the entire graph (i.e. the solution to the MCP).

One of the foundations of this approach lies in the utilization of local information content embedded in the spatio-temporal characteristics of a dynamical system, such as the coupled oscillator networks described herein, to perform computation in a highly parallel fashion. This is in contrast to the traditional model of von-Neumann computing which typically relies on batch, discrete time, iterative updates, lacking temporal locality, and shared states, lacking spatial locality.

Figure 1:
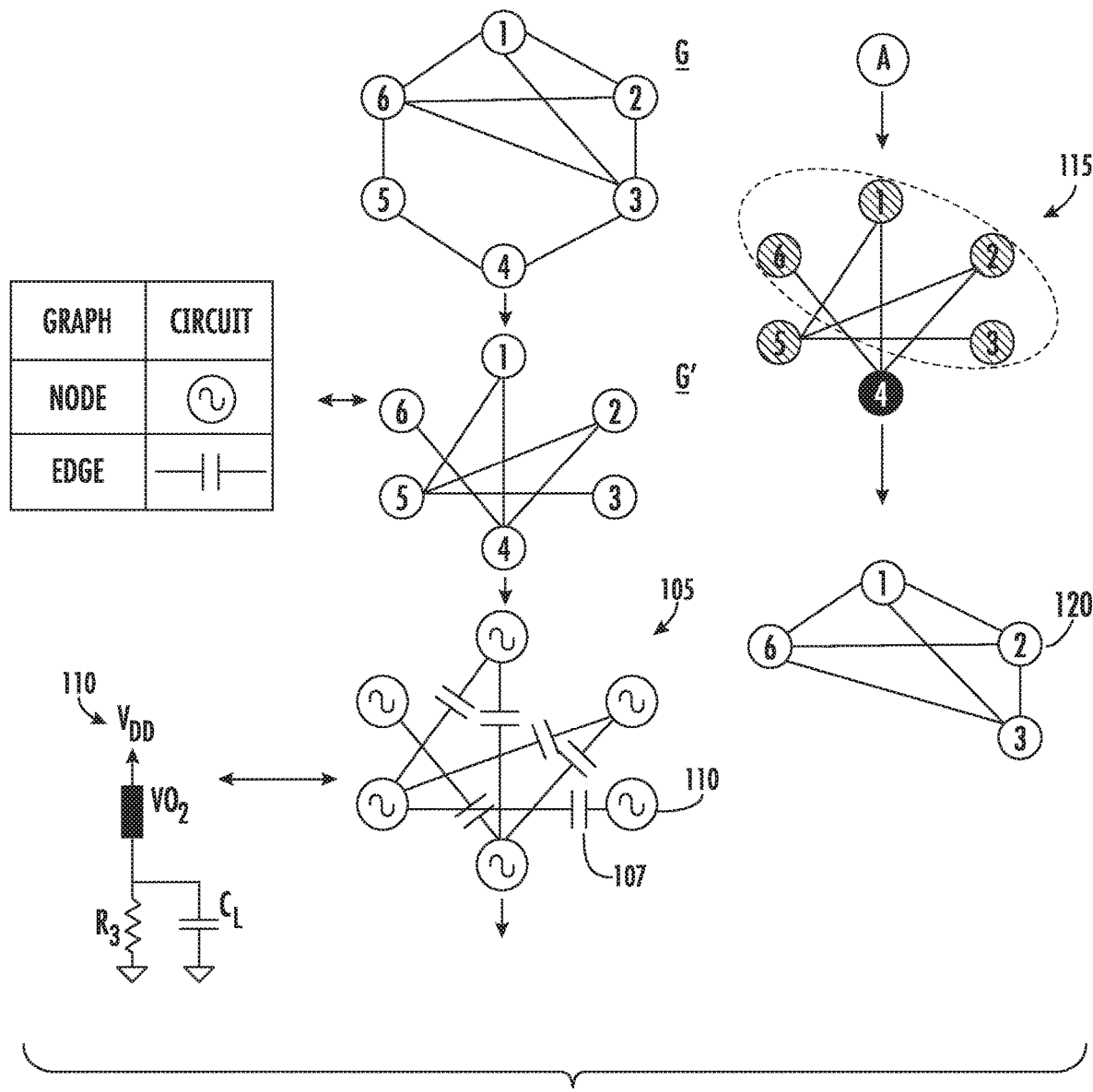
FIG. 1 is a schematic illustration of an overview of approximating the maximum clique of a graph using the phase dynamics of graph of a network of coupled oscillator circuits in some embodiments according to the invention.

In some embodiments according to the invention, a system of 32 insulator-metal transition (IMT)-based relaxation oscillators with (reconfigurable) capacitive coupling can be used to represent the complement of a subgraph, where a vertex in the subgraph to be processed corresponds to an oscillator, and every edge of the subgraph maps to a coupling capacitor as shown in FIG. 1 where each oscillator is the IMT device-here, VO2 (vanadium dioxide). The VO2 exhibits a voltage-controlled volatile and abrupt change in resistance in series with a resistive element which provides a negative feedback that stabilizes the relaxation oscillatory behavior.

As further appreciated by the present inventors, the (capacitive) coupling dynamics of such oscillators are such that (a) no two oscillators (vertices) that share an edge (capacitor) have the same phase; and (b) the temporal ordering of the phases is such that vertices nodes can be partitioned into groups having no common edge. The above analog approach is further described in *Vertex Coloring Of Graphs Via Phase Dynamics Of Coupled Oscillatory Networks*, by A. Parihar, N. Shukla, M. Jerry, S. Datta, and A. Raychowdhury, *Sci. Rep.*, vol. 7, no. 1, pp. 1-11, 2017, the entire disclosure of which is incorporated herein by reference.

Embodiments according to the present invention can exploit the direct correspondence of these phase properties to the Independent Sets (ISs) of a graph (or subgraph), which is equivalent to the maximum clique of the complement graph. Thus, to determine the maximum clique of a graph G, we can compute the MIS of the complement of the graph using the proposed coupled oscillator system.

Figure 4:
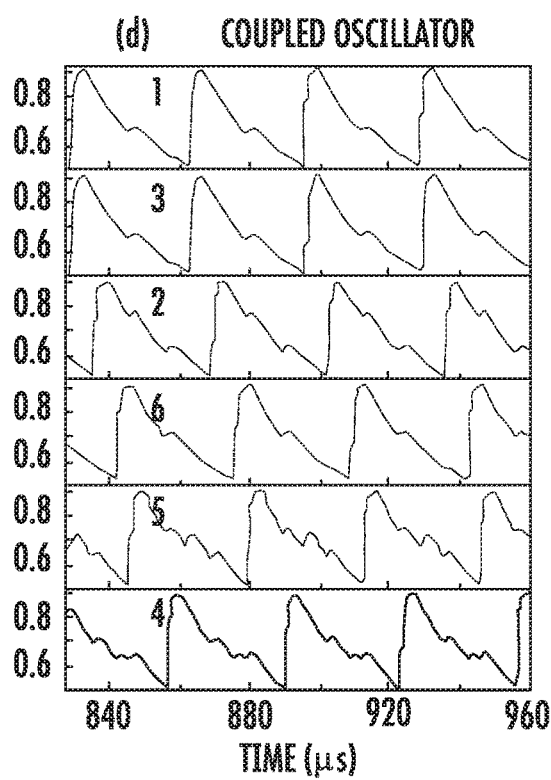
FIG. 4 shows exemplary time domain waveforms of the coupled VO2 relaxation oscillators of FIG. 1 showing the unique temporal ordering of the phases for the illustrated graph of FIG. 1 in some embodiments according to the invention.

Embodiments according to the invention incorporating the coupled oscillator framework described herein where implemented in a SPICE environment where a small device-to-device variation (<0.1%) was included in the series resistance of each oscillator to reduce the possibility of the system settling to the trivial solution i.e. all oscillators at same frequency and phase. In other words, if two oscillators were identical, they could be considered as being nominally locked in phase and frequency. The relative oscillator phases, which are reflected in the position of the rising edges (as shown in FIG. 4), can be acquired using a simple peak detection scheme.

FIG. 1 is a schematic illustration of an overview of approximating the maximum clique of a graph or subgraph using the phase dynamics of graph of a network of coupled oscillator circuits in some embodiments according to the invention. In particular, FIG. 1 illustrates the approach to solving the MCP including an example and the phase properties of the coupled oscillators which facilitate the solution. According to FIG. 1, a graph G is complemented to provide G'. Using the basic graph property that the maximum clique of a graph G is also the MIS 115 of its complement ', we first map the complement graph G' to the oscillator network 105 where nodes in G' are represented as VO oscillators 110 and the edges in G' are represented as coupling capacitors 107 between the VO oscillators 110. Accordingly, the MIS 115 is used to derive the clique 120 of G in FIG. 1.

Figure 2:
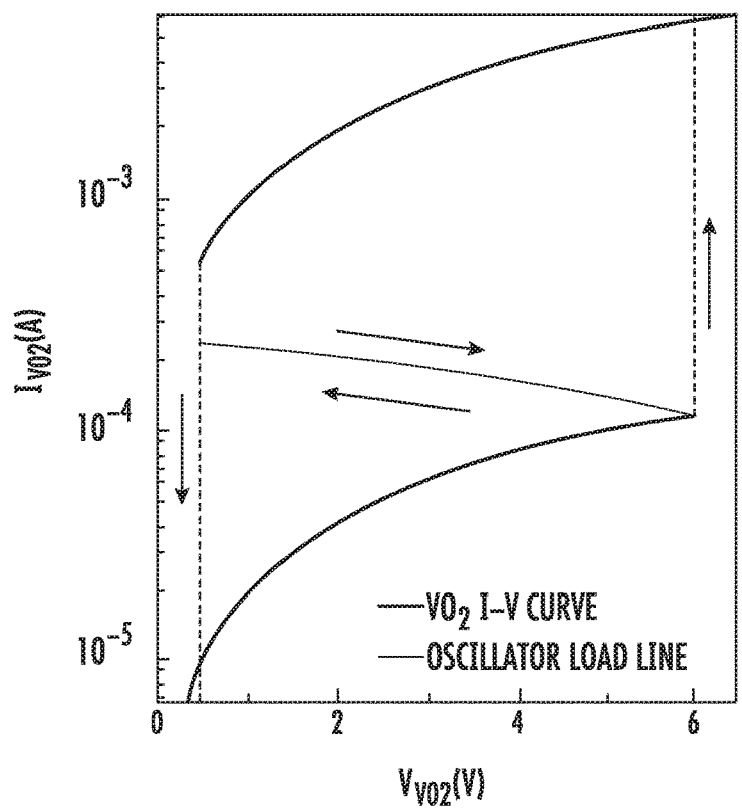
FIG. 2 is a waveform of a vanadium dioxide (VO2) I-V characteristics of the VO2 relaxation oscillator circuit shown in FIG. 1 in some embodiments according to the invention.
Figure 3:
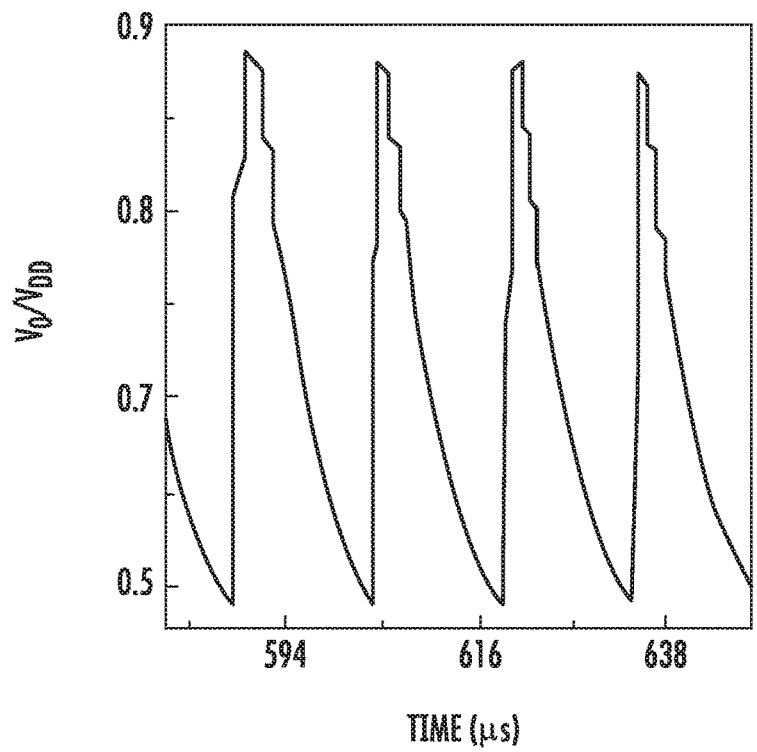
FIG. 3 is a time domain waveform of the VO2 relaxation oscillator circuit shown in FIG. 1 in some embodiments according to the invention.
Figure 5:
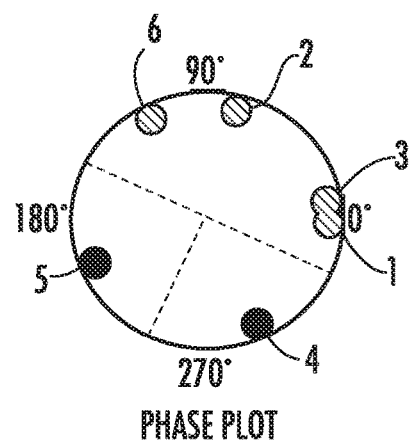
FIG. 5 is a phase plot diagram of the phase relationships between the coupled VO2 relaxation oscillators of FIG. 1 illustrating the grouping of the nodes into independent sets including the maximum independent set of nodes 1, 3, 2, and 6 in the graph of FIG. 1 in some embodiments according to the invention.
Figure 6:
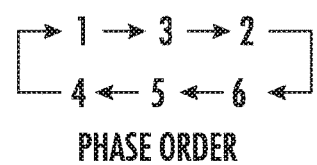
FIG. 6 is a schematic representation of the phase ordering of the nodes shown in the graph of FIG. 1 and the phase plot of FIG. 5 in some embodiments according to the invention.

The steady state phases of the oscillators are shown in FIG. 2, which is a waveform of a vanadium dioxide (VO2) I-V characteristics of the VO2 relaxation oscillator circuit shown in FIG. 1 in some embodiments according to the invention. According to FIG. 2, the steady state phases of the oscillators in the graph G produce a (cyclic) temporal ordering of, 1, 3, 2, 6, 5, 4, in FIG. 6 such that all nodes can be partitioned into groups having no common edge in the graph. For example, since nodes 1, 3, 2, and 6 do not share an edge in the graph among themselves they appear together (i.e., an independent set) as shown in the phase plot of FIG. 5. As appreciated by the present inventors, this ordering is enabled by the inherent physics of the oscillator platform.

Further, it can be observed that the settling time of the coupled oscillators i.e. time required to attain steady state is a function of the size and the average connectivity. Settling time typically increases with size and average connectivity of the oscillator network (graph (G)). Subsequently, the individual groups (of nodes sharing no common edge), also known as independent sets in G' can be partitioned using a worst-case time complexity of $O(n^2)$. The Maximum Independent SET 115 of G' is the Maximum Clique 120 of the input graph, G.

Figure 7:
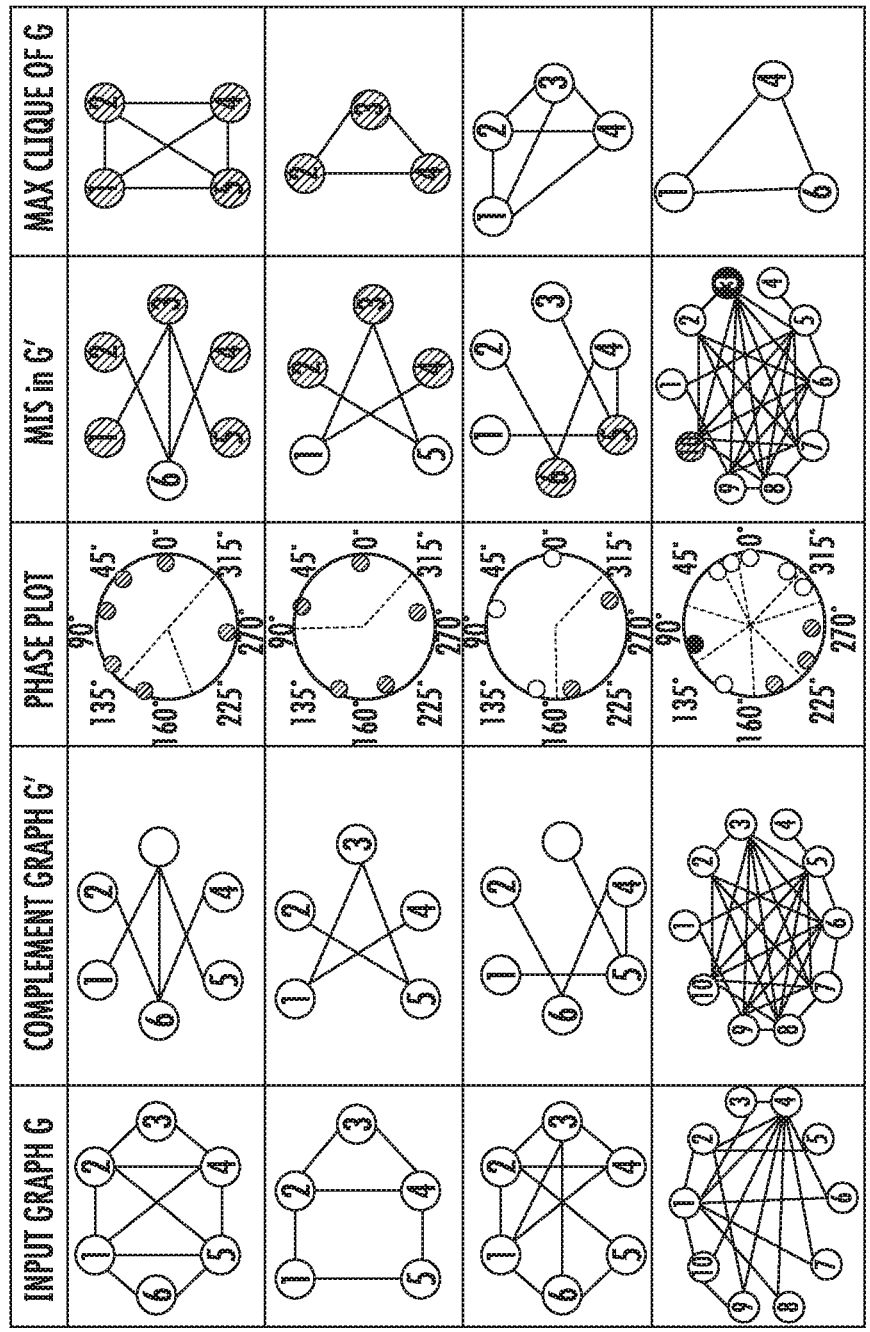
FIG. 7 is an illustration of exemplary graphs and respective analyses using VO2 relaxation oscillators circuits coupled together according to the approach shown in FIG. 1 to provide a maximum clique result for each of the exemplary graphs in some embodiments according to the invention.

FIG. 7 is an illustration of exemplary graphs and respective analyses using VO2 relaxation oscillators circuits coupled together and operated according to the approach shown in FIGS. 1-6 to provide a maximum clique result for each of the exemplary graphs in some embodiments according to the invention.

While the above approach can compute the maximum clique, it is limited to the size graph that can be represented by the oscillator hardware. For example, if the capacity of the hardware is 32 oscillators, only graphs having 32 nodes or less can be directly represented and operated by the hardware. Therefore in some embodiments according to the invention, graphs are decomposed into subgraphs that can be represented by the capacity of the oscillator hardware. For example, if a graph includes 320 nodes and the oscillator hardware can represent 32 nodes, the graph can be decomposed into 10 subgraphs or 32 nodes each whereupon the complement of each of the subgraphs can be programmed into the oscillator hardware which is then operated to derive the independent set of nodes included in each of the complemented subgraphs. It will be understood that in some embodiments according to the invention multiple instantiations of the oscillator hardware can be provided so that multiple subgraphs can be processed in parallel. In some embodiments according to the invention the oscillator hardware can be programmed with the compliment of each subgraph in serial so that the independent sets of the compliment subgraphs are derived sequentially. In still other embodiments according to the invention, a combination of the parallel and series operations described above can be used.

Figure 8A:
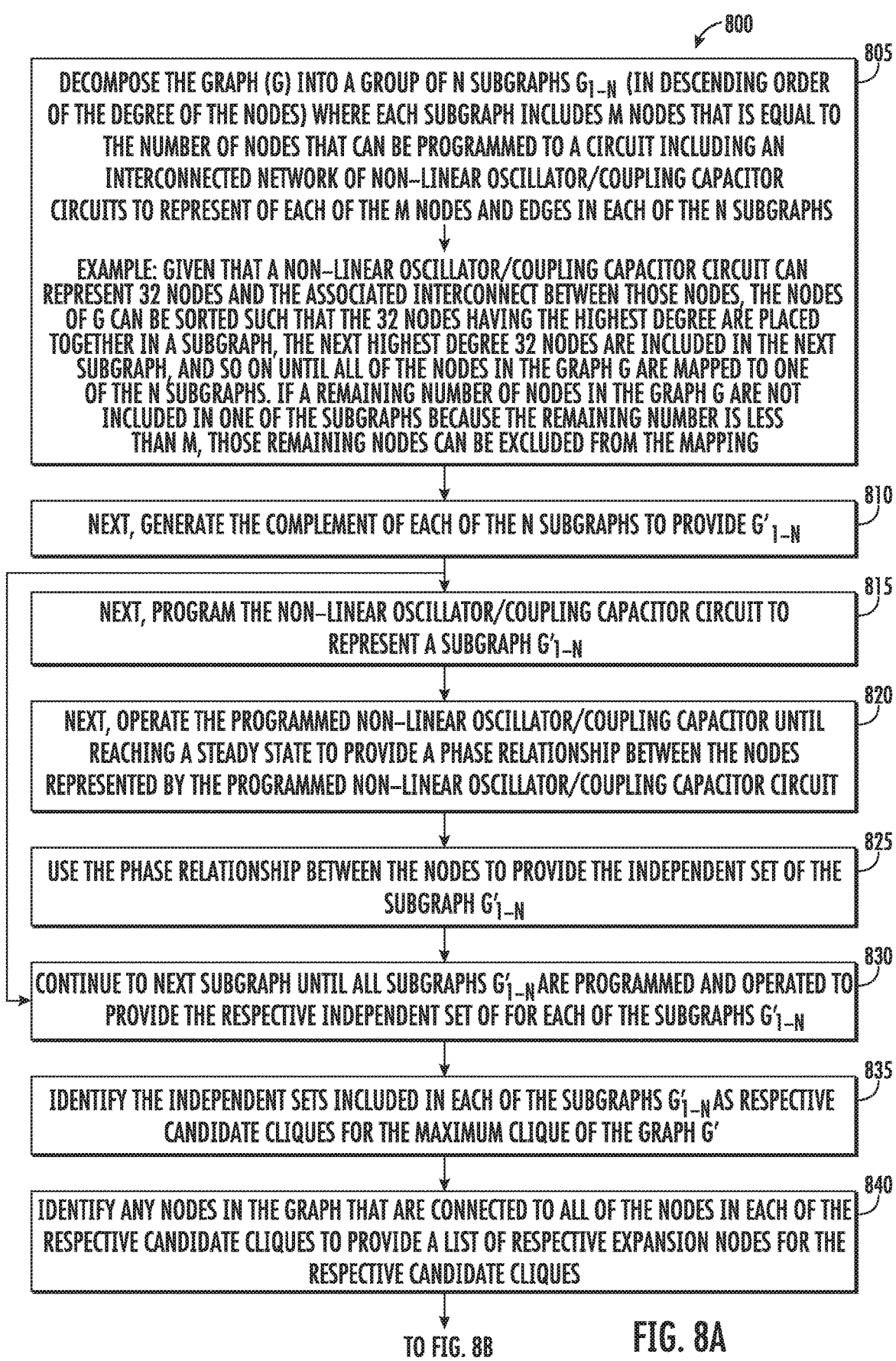
FIGS. 8A-B shows a flowchart illustrating operations of representing a graph as a plurality of subgraphs where each subgraph can be represented as a network of coupled non-linear oscillator circuits that, when operated, can provide a representation of the independent sets of the subgraph complements, to provide the cliques of each of the subgraphs and the subsequent expansion of the cliques using a corresponding representation of nodes in the graph that are connected to all of the nodes in the cliques for each subgraph, as a network of coupled non-linear oscillator circuits to provide expanded cliques of the subgraphs, the largest one of which can be identified as the maximum clique of the graph in some embodiments according to the invention.
Figure 8B:
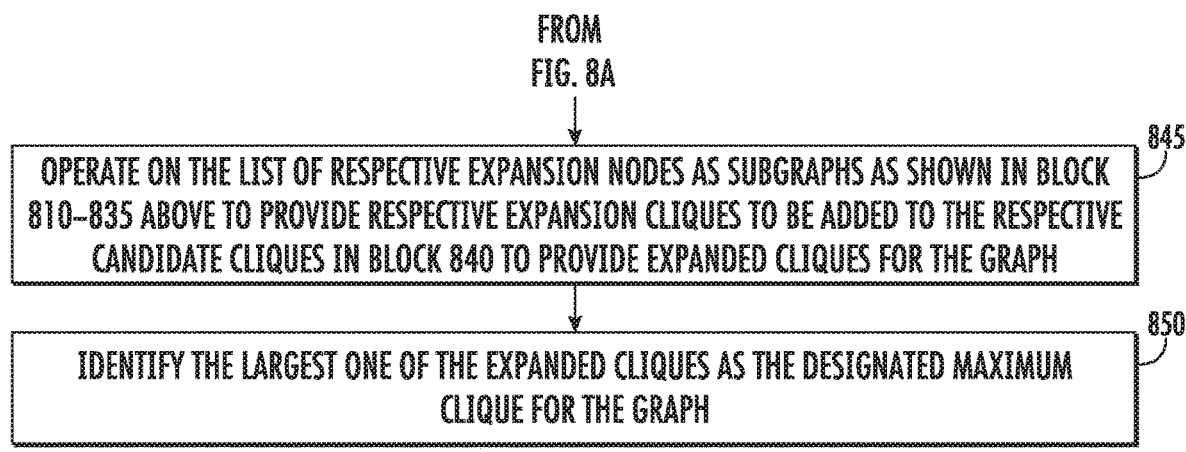

FIGS. 8A-B show a flowchart illustrating operations of representing a graph as a plurality of subgraphs where each subgraph can be represented as a network of coupled non-linear oscillator circuits that, when operated, can provide a representation of the independent sets of the subgraph complements, to provide the cliques of each of the subgraphs and the subsequent expansion of the cliques using a corresponding representation of nodes in the graph that are connected to all of the nodes in the cliques for each subgraph, as a network of coupled non-linear oscillator circuits to provide expanded cliques of the subgraphs, the largest one of which can be identified as the maximum clique of the graph in some embodiments according to the invention.

As appreciated by the present inventors, the operations 800 carried out in FIGS. 8A-B can decompose the graphs into multiple subgraphs that are compatible with the hardware size (e.g., 32 nodes) based on the assumption that the decomposition produces sub-graphs such that there exists at least one clique in at least one subgraph which is a subset of the maximum clique(s) of G. The operations in FIGS. 8A-B are described using an example where the oscillator hardware has the capacity to represent (to be programmed with) and operate a subgraph including 32 nodes and associated edges. It will be understood however, that embodiments according to the invention may be scaled up or down as needed and are therefore not limited to a particular number of nodes.

According to FIGS. 8A-B, as a part of the initial pre-processing, we exclude vertices having degree (a) less than the 2 as a clique of size 2 is a trivial solution to a connected graph. Subsequently, we decompose the graph into subgraphs G1, G2 . . . GN, each containing 32 nodes (equal to the size of the oscillator platform). To define the subgraph, we sort the nodes in descending order of their degrees. The first subgraph G1 is constructed by selecting the nodes with the highest degree, and considering 31 other nodes from its neighborhood graph in (descending) order of their degrees (block 805).

The other groups G2-GN are formed by repeating the same procedure on the remaining nodes. If the size of Gi<32 in some embodiments, no further subgraphs are because the remaining subgraph Gx is likely sparse and any nodes in the subgraph belonging to the maximum clique will be considered in the subsequent clique expansion given that at-least one node of the max clique solution lies in the subgraph, as long as the maximum clique is not exclusively located in Gx (Block 807).

The complement of each subgraph (G1'-GN') is generated (block 810) and we program G1'-GN' into the oscillator hardware (block 815) and operate the network of oscillator circuits (block 820) as described above in reference to FIGS. 1-6 to provide the phase relationships among the nodes to identify all the independent sets in each of the subgraphs (block 825), which is equivalent to a clique in each corresponding subgraph G, although not necessarily a maximal clique of the subgraph G. It will be understood that the operations described above and shown in blocks 815-825 are continued until all of the subgraphs G' have been processed by the oscillator hardware to provide the respective independent set for each subgraph G' (block 830) whereupon operations continue wherein the maximum independent set of each subgraph G's identified as a clique that is a candidate to be identified as the maximum clique of the graph G (block 835).

When As described earlier, as long as at least one clique belongs to the maximum clique, the scaling approach described herein will converge to the correct solution (i.e. identify the maximum clique of the graph G). Accordingly, we expand the respective candidate cliques by adding to it those candidate cliques, the clique found from a set of nodes which are connected to all the nodes of respective candidate cliques, referred to herein as the expansion nodes (block 840). The process of finding the clique among the expansion nodes (block 840) can be implemented using the coupled oscillator platform described above in blocks 815-830 and as shown in FIG. 1-6, the result of which provides the expanded cliques for the subgraphs of G which are the maximal cliques (block 845) the largest clique of which is identified as the maximum clique of the graph G (block 850).

Figure 9:
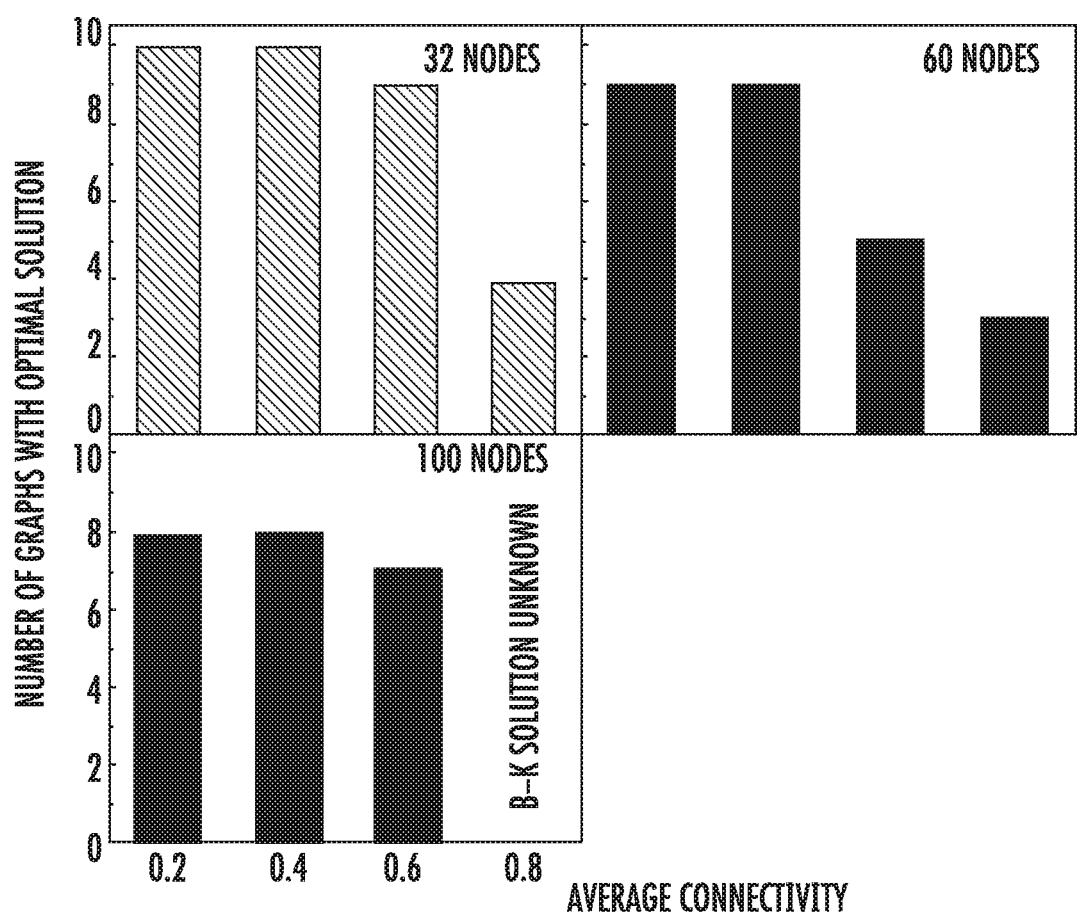
FIG. 9 illustrates graphs showing experimental results comparing maximum cliques for 160 random instances (4 different nodes with 4 different connectivities) of graph in an oscillator system compared to using the Bron-Kerbosch (B-K) algorithm including a number of instances (out of 10) with optimal solution for each connectivity in some embodiments according to the invention.

To assess the performance of the approach described herein approach, we evaluated the maximum clique in (a) randomly generated graphs with different number of nodes and average connectivity; (b) graphs in the DIMACs database, and compare it with the solution obtained using a standard max clique (Bron-Kerbosch algorithm). The results are summarized in FIGS. 9 and 10, wherein FIG. 9 illustrates graphs showing experimental results comparing maximum cliques for 160 random instances (4 different nodes with 4 different connectivities) of graph in an oscillator system compared to using the Bron-Kerbosch (B-K) algorithm including a number of instances (out of 10) with optimal solution for each connectivity in some embodiments according to the invention and FIG. 10 illustrates bubble plots showing a comparison between the two approaches shown in FIG. 9 in some embodiments according to the invention.

Figure 10:
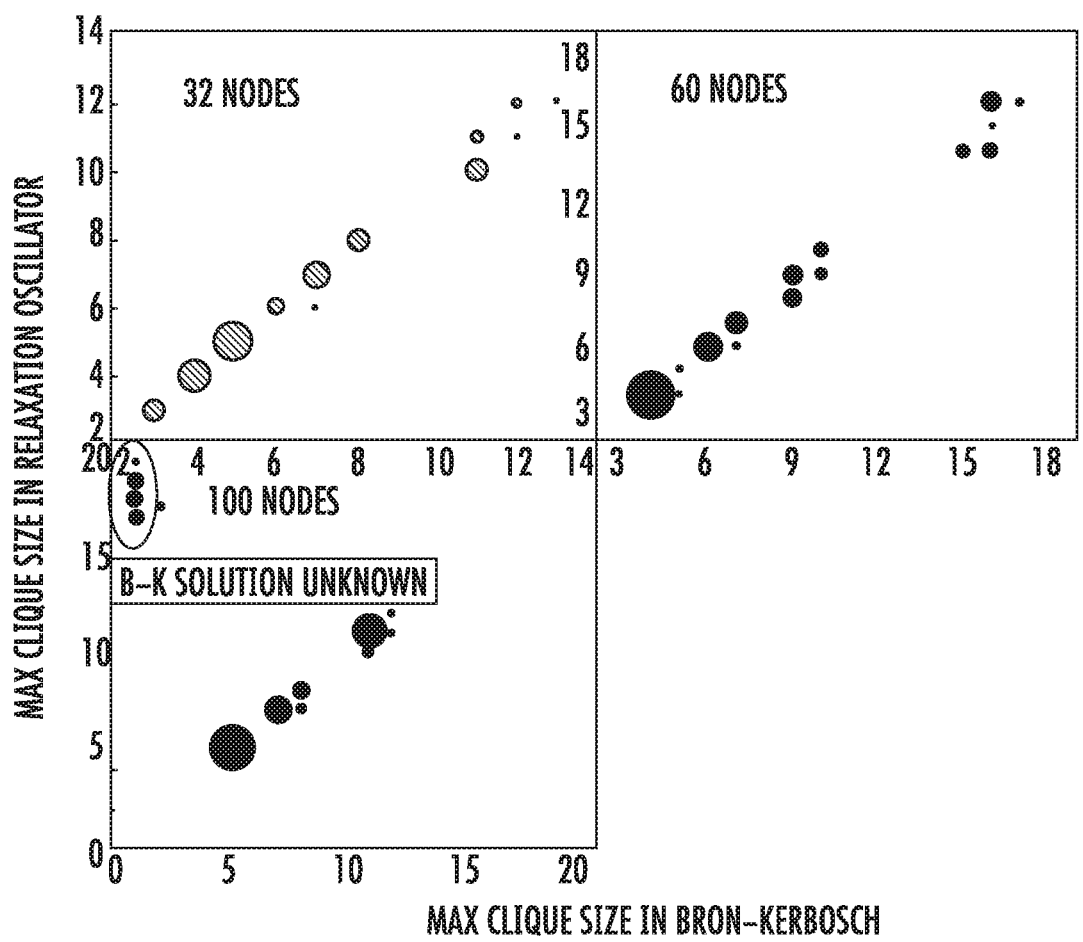
FIG. 10 illustrates bubble plots showing a comparison between the two approaches shown in FIG. 9 in some embodiments according to the invention.

The bubble plots of FIG. 10 compare the maximum clique solution obtained using the coupled oscillators and the standard Bron-Kerbosch algorithm for a total of 160 randomly generated graphs with distribution of nodes (32, 60, 100, 150) and spanning across a broad range of (average) connectivity (0.2, 0.4, 0.6, 0.8); ten graphs are analyzed for each combination of node and connectivity. It can be observed that embodiments according to the present invention computed a near-optimal solution for all the tested graphs and exhibits optimality in over 90% of the cases. Furthermore, it is noteworthy that embodiments according to the present invention were able to process large and dense graphs where the Bron-Kerbosch algorithm failed to converge to a solution (each graph is processed using the BK algorithm for over 7 hours).

Furthermore, embodiments according to the present invention were also benchmarked with 8 instances of graph from DIMACS database shown in FIG. 11 which presents the maximum clique solution obtained using our approach, the Bron-Kerbosch algorithm and that specified by DIMACS database. As shown embodiments according to the invention provided a near-optimal/optimal solution for all the instances where the Bron-Kerbosch failed even after 12 hours of processing.

As described herein, in some embodiments according to the invention, a scalable non-Boolean coupled oscillator platform is can be provided to accelerate the archetypal NP-hard maximum clique problem. Embodiments according to the invention can leverage the inherent phase dynamics of the coupled oscillators in conjunction with a hardware-compatible graph decomposition strategy to compute near-optimal solutions (for example, optimal in over 90% of the cases) to graphs that are larger than the hardware capacity.

Figure 12:
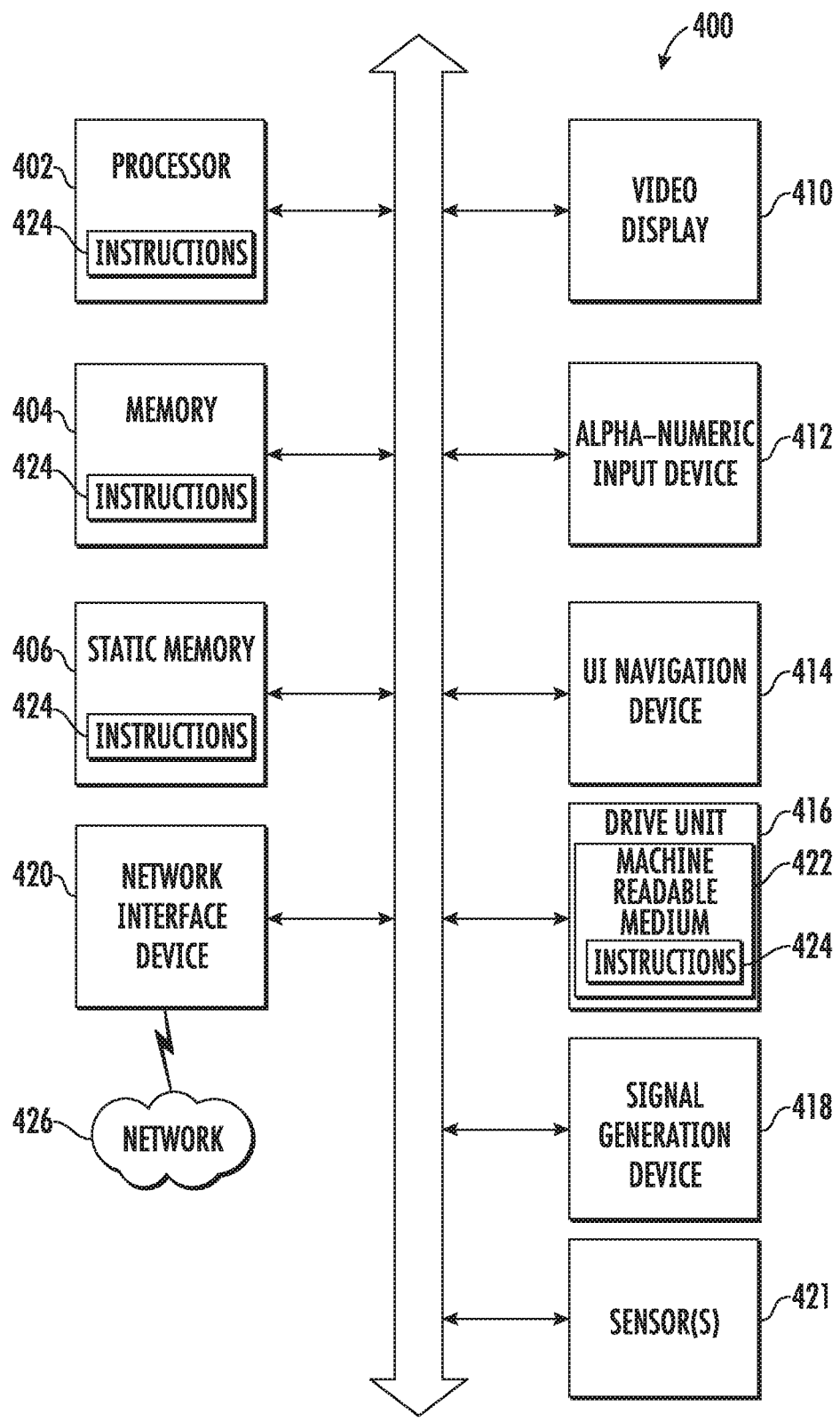
FIG. 12 is a block diagram of a computing system that can be used to perform processor-executable instructions represented by non-transitory processor-readable media to carry out the operations shown in FIGS. 8A-B in some embodiments according to the invention.

FIG. 12 is a block diagram illustrating an example of a machine upon which one or more aspects of embodiments of the present invention can be implemented. For example the block diagram of FIG. 12 illustrates a computing system that can be used to perform processor-executable instructions represented by non-transitory processor-readable media to carry out the operations shown in FIGS. 8A-B in some embodiments according to the invention. An aspect of an embodiment of the present invention includes, but not limited thereto, a system, method, and computer readable medium that provides for solving the maximum clique problem using coupled relaxation oscillators; which illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 810, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:

1. A method of approximating a maximum clique of a graph, the method comprising:
   operating a plurality of non-linear oscillator/coupling capacitor circuits connected to one another according to a respective plurality of degree-ordered subgraphs of the graph to provide respective candidate cliques for a maximum clique of the graph;
   identifying nodes in the graph that are connected to all of the nodes in each of the respective candidate cliques to provide respective expansion node subgraphs for the respective candidate cliques;
   operating the plurality of non-linear oscillator/coupling capacitor circuits connected to one another according to the respective expansion node subgraphs to provide respective expansion cliques for the respective candidate cliques; and
   adding the respective expansion cliques to the respective candidate cliques to identify a highest degree complete subgraph as a designated maximum clique for the graph.

2. The method according to claim 1 wherein at least one of the respective candidate cliques is included in the maximum clique of the graph.

3. The method according to claim 2 wherein at least one of the respective candidate cliques is included in the maximum clique of the graph.

4. The method according to claim 1 wherein operating the plurality of non-linear oscillator/coupling capacitor circuits connected to one another according to the respective plurality of degree-ordered subgraphs comprises:
   deriving a respective complement subgraph from each of the respective plurality of degree-ordered subgraphs; and
   operating the plurality of non-linear oscillator/coupling capacitor circuits to provide a phase relationship among the non-linear oscillator/coupling capacitor circuits to derive independent sets of nodes included in each respective complement subgraph.

5. The method according to claim 4 wherein operating the plurality of non-linear oscillator/coupling capacitor circuits further comprises:
   using vertex coloring to provide the phase relationship among the non-linear oscillator/coupling capacitor circuits.

6. The method according to claim 4 wherein operating the plurality of non-linear oscillator/coupling capacitor circuits connected to one another according to the respective plurality of degree-ordered subgraphs comprises:
   deriving a respective complement subgraph from each of the respective plurality of degree-ordered subgraphs;
   assigning an insulator-metal transition (IMT) based relaxation oscillator to each node in the respective complement subgraph; and
   assigning a coupling capacitor to each edge connecting nodes in the respective complement subgraph.

7. A circuit for approximating a maximum clique of a graph, the circuit comprising:
   a plurality of non-linear oscillator circuits configured to connect with one another according to a respective complement of a subgraph of the graph;
   a plurality of coupling capacitors configured to interconnect any of the plurality of non-linear oscillator circuits with one another according to edges included in the respective complement of the subgraph to provide a network of non-linear oscillator/coupling capacitor circuits representing the respective complement of the subgraph; and a hardware processor circuit configured to operate the network of non-linear oscillator/coupling capacitor circuits to provide respective candidate cliques for a maximum clique of the graph and configured to operate the network of non-linear oscillator/coupling capacitor circuits according to a respective expansion node subgraph to provide a respective expansion clique for the respective candidate cliques; and wherein the hardware processor circuit is further configured to identify nodes in the graph that are connected to all of the nodes in the respective candidate clique to provide the respective expansion node subgraph for the respective candidate clique;

wherein the hardware processor circuit is further configured to add the respective expansion clique to the respective candidate clique to identify a highest degree complete subgraph as a designated maximum clique for the graph.

8. The circuit according to claim 7 wherein the plurality of non-linear oscillator circuits and the plurality of coupling capacitors are reconfigurable to provide a respective plurality of degree-ordered subgraphs of the graph to provide respective candidate cliques for a maximum clique of the graph.

9. The circuit according to claim 8 wherein at least one of the respective candidate cliques is included in the maximum clique of the graph.

10. One or more non-transitory processor-readable media storing processor-executable instructions for causing one or more processors to perform a method approximating a maximum clique of a graph, the method comprising:

operating a plurality of non-linear oscillator/coupling capacitor circuits connected to one another according to a respective plurality of degree-ordered subgraphs of the graph to provide respective candidate cliques for a maximum clique of the graph;

identifying nodes in the graph that are connected to all of the nodes in each of the respective candidate cliques to provide respective expansion node subgraphs for the respective candidate cliques;

operating the plurality of non-linear oscillator/coupling capacitor circuits connected to one another according to the respective expansion node subgraphs to provide respective expansion cliques for the respective candidate cliques; and adding the respective expansion cliques to the respective candidate cliques to identify a highest degree complete subgraph as a designated maximum clique for the graph.

11. The one or more non-transitory processor-readable media storing processor-executable instructions according to claim 10 wherein at least one of the respective candidate cliques is included in the maximum clique of the graph.

12. The one or more non-transitory processor-readable media storing processor-executable instructions according to claim 11 wherein at least one of the respective candidate cliques is included in the maximum clique of the graph.

13. The one or more non-transitory processor-readable media storing processor-executable instructions according to claim 10 wherein operating the plurality of non-linear oscillator/coupling capacitor circuits connected to one another according to the respective plurality of degree-ordered subgraphs comprises:

deriving a respective complement subgraph from each of the respective plurality of degree-ordered subgraphs; and operating the plurality of non-linear oscillator/coupling capacitor circuits to provide a phase relationship among the non-linear oscillator/coupling capacitor circuits to derive independent sets of nodes included in each respective complement subgraph.

14. The one or more non-transitory processor-readable media storing processor-executable instructions according to claim 13 wherein operating the plurality of non-linear oscillator/coupling capacitor circuits further comprises:

using vertex coloring to provide the phase relationship among the non-linear oscillator/coupling capacitor circuits.

15. The one or more non-transitory processor-readable media storing processor-executable instructions according to claim 13 wherein operating the plurality of non-linear oscillator/coupling capacitor circuits connected to one another according to the respective plurality of degree-ordered subgraphs comprises:

deriving a respective complement subgraph from each of the respective plurality of degree-ordered subgraphs;

assigning an insulator-metal transition (IMT) based relaxation oscillator to each node in the respective complement subgraph; and assigning a coupling capacitor to each edge connecting nodes in the respective complement subgraph.

\* \* \* \* \*